Nov. 29, 1966  N. W. BUNTING  3,288,270

TRANSFER APPARATUS

Filed Feb. 19, 1965 2 Sheets-Sheet 1

INVENTOR.
NORMAN W. BUNTING
BY Stanley J Price
his Attorney

INVENTOR.
NORMAN W. BUNTING
BY Stanley J Price
his Attorney

United States Patent Office 3,288,270
Patented Nov. 29, 1966

3,288,270
TRANSFER APPARATUS
Norman W. Bunting, Hillsboro, Ohio, assignor to Koppers Company, Inc., a corporation of Delaware
Filed Feb. 19, 1965, Ser. No. 433,859
5 Claims. (Cl. 198—103)

This invention relates to apparatus for transferring particulate material from or to a conveying means and more particularly to apparatus for transferring particulate material from one endless belt conveyor to another endless belt conveyor.

Endless belt conveyors have been found in recent years to be one of the most efficient means of transporting solid material from one location to another location. The endless belt conveyors are versatile in that the material being transported may be easily split into two or more streams and transported to different locations. One disadvantage of an endless belt conveyor is that it must transport materials in a straight line. Belt turning devices have been proposed which permit the endless belt to change direction; however, even with these expensive cumbersome belt turning devices it is necessary to transfer the material being transported from one linear section of the belt to the other linear section. It is, therefore the present practice to employ a plurality of endless belts to transport material along a circuitous path. The material is transferred from one endless belt to another endless belt at a junction or transfer station. Also, where the material being transported is separated into two streams, it is discharged from one belt onto two or more belts at a transfer station. The endless belt or belts that receive the material discharged from the preceding belt are positioned beneath the head pulley of the preceding belt and the material is discharged from the preceding belt at the head pulley and falls onto the belts positioned therebelow. The transfer stations have bins or chutes that receive the material discharged from the head pulley of the preceding belt and direct the discharged material onto the endless belt positioned therebelow adjacent to the tail pulley. Problems are encountered in transferring materials from one endless conveyor belt to another. For example, when the material being transported is sticky it adheres to the side walls of the bin or chute and eventually bridges over and closes the outlet opening. Where the material being transported comprises large, heavy lumps, the endless conveyor belt of the receiving conveyor is subjected to abrasion and wear by the impact force of the material as it strikes the endless conveyor belt of the receiving conveyor. Where the material is fine and granular, tight-fitting skirt boards must be provided on the receiving conveyor to prevent excessive spillage. It is also highly desirable in order to minimize belt wear to uniformly load the material being transported onto the center of the conveyor belt; otherwise the conveyor belt does not track properly, causing wear on the edges of the endless conveyor belt.

In many installations, such as steel mills and the like, the same endless belt conveyors are used to transport many different materials, for example, dry iron ore, wet iron ore, limestone, iron ore pellets, coal, coke and the like. It is, therefore, highly desirable that the transfer stations be adapted to properly and efficiently transfer the various materials conveyed from one endless belt conveyor to another without excessive maintenance and repair and with a minimum of spillage at the transfer stations.

Apparatus within the transfer stations have been suggested in the past to eliminate one of the above discussed problems. For example, stone box or shelf material is positioned within the bins or chutes to receive the material discharged from the head pulley of the preceding endless belt conveyor. This reduces the bin or chute liner wear and arrests the free fall of the material as it is discharged over the head pulley of the preceding endless belt conveyor and reduces the impact wear on the receiving endless belt conveyor. The stone box or shelf material is found unsuitable, however, where a sticky material is being transported because the sticky material adheres to the shelf within the bin and gradually bridges the opening and plugs the bin outlet.

Briefly, the herein described invention eliminates all of the above problems and provides transfer apparatus between endless conveyor belts where material having different physical properties may be efficiently transferred from an endless belt conveyor to one or more other endless conveyors. The transfer apparatus includes one or more rotary drum feeders positioned within the bin or chute. The rotary drum feeders have longitudinal pockets or recessed portions in the outer surface. The particulate material is discharged from the overhead conveyor into the recessed pockets. The rotation of the drum feeder discharges the material from the recessed pockets onto the receiving endless belt conveyor adjacent the tail pulley. The circumferential surface of the drum feeder is preferably fabricated of a flexible material in such a manner that a plurality of inturned catenary portions are provided therein. As the drum feeder rotates, the flexible material forming the trough-like recesses moves circumferentially outwardly and flexes to discharge the material therefrom. Suitable weights may be provided for the flexible material to increase the degree of flexure imparted thereto as the material is discharged from the recessed pockets by the rotation of the drum feeder. The drum feeder is rotated at a preselected speed and may be drivingly connected to the head pulley of the preceding endless belt conveyor.

With the above transfer apparatus it is now possible to efficiently transfer materials having different physical properties from an endless belt conveyor to one or more other endless belt conveyors. It should be understood that although the transfer apparatus is described in conjunction with endless belt conveyors, the transfer apparatus may be utilized with other types of conveying means where one or more of the above discussed problems are present.

Accordingly, the principal object of this invention is to provide a transfer apparatus that may be utilized to transfer materials having different physical properties from a higher elevation to a lower elevation.

Another object of this invention is to provide a drum type feeder mechanism having a circumferential surface of flexible material with longitudinal trough-like recessed portions therein for receiving material from a position thereabove and for discharging the material from the recessed portions onto a receiver positioned therebelow.

Another object of this invention is to provide transfer apparatus for transferring particulate material from one endless conveyor belt to another endless conveyor belt positioned therebelow which includes a rotary drum feeder driven by the head pulley of the preceding conveyor.

Another object of this invention is to provide transfer apparatus for transferring material from a single endless belt conveyor to two or more endless belt conveyors positioned therebelow.

These and other objects and advantages of the present invention will be more completely disclosed and described in the following specification, the accompanying drawings and the appended claims.

Figure 1:
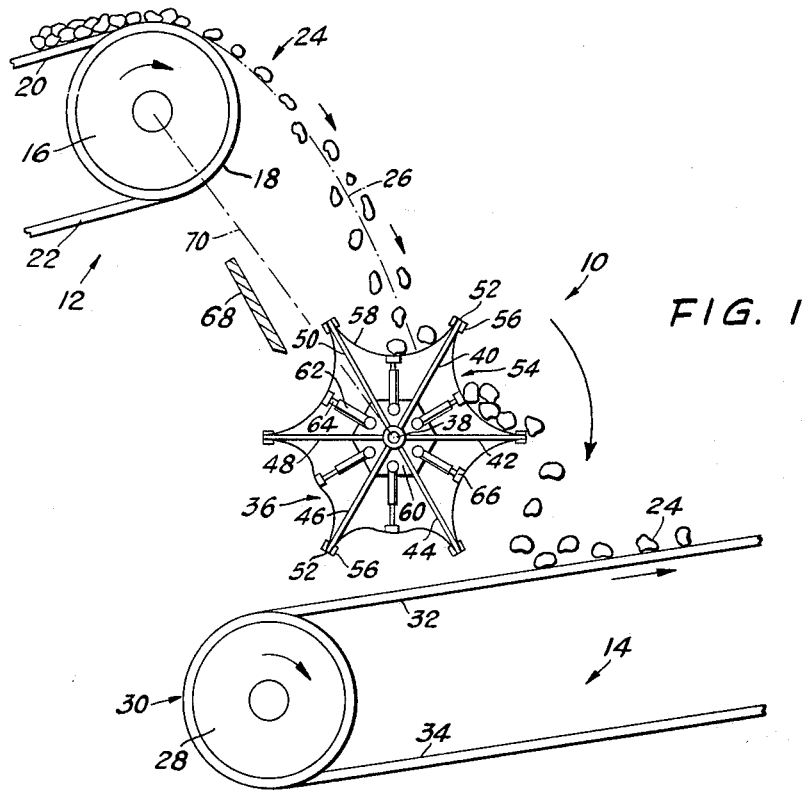
FIGURE 1 is a semidiagrammatic view of the transfer apparatus positioned between a pair of endless belt conveyors.

Referring to FIGURE 1 there is illustrated my improved transfer apparatus generally designated by the numeral 10 positioned between an elevated endless conveyor 12 and another endless conveyor 14 positioned therebelow. The endless conveyor 12 has a head pulley 16 suitably supported on a support frame (not shown) and arranged to rotate in a clockwise direction as illustrated. An endless conveyor belt 18 is reeved around the head pulley 16 and has an upper conveying reach 20 and a lower return reach 22. Particulate material, such as lumps of iron ore, coal, coke or the like, generally indicated by the numeral 24, is conveyed from a distant location by the endless conveyor belt 18. The particulate material 24 is conveyed on the upper conveying reach 20 and discharged therefrom at the head pulley 16 as the endless belt 18 moves therearound. The particulate material as it is discharged from the conveyor belt 18 falls by gravity along the trajectory indicated by the line 26. The transfer station 10 is utilized to transfer the material 24 from the conveyor 12 to the conveyor 14 positioned therebelow and may include an enclosure, bin or chute structure that has been omitted from FIGURE 1 to more clearly illustrate the invention.

The endless conveyor belt 14 has a tail pulley 28 with an endless conveyor belt 30 reeved therearound. The endless conveyor belt 30 has a conveying reach 32 and a lower return reach 34. Suitable means are provided to propel the endless conveyor belts 18 and 30 about their respective head and tail pulleys. The material 24 discharged from the head pulley 16 is arranged to be transferred by means of the transfer apparatus to the conveying reach 32 of the endless conveyor 14 positioned therebelow and to be conveyed to another distant location in the direction indicated by the arrow in FIGURE 1.

Although the conveyors 12 and 14 are indicated as extending in the same linear direction it should be understood that the conveyor 14 may be arranged in any angular relation with the conveyor 12 since the conveyors 12 and 14 are independent of each other.

Within the enclosure of the transfer apparatus 10 there is positioned a rotary drum feeder generally designated by the numeral 36 that has a shaft 38 extending therethrough substantially parallel to the tail pulley 28 and head pulley 16. The shaft 38 is suitably supported in the side walls of the enclosure to maintain the rotary drum feeder 36 in the position indicated. A plurality of plates 40, 42, 44, 46, 48 and 50 are secured to and extend radially from the shaft 38. These plates extend substantially the same radial distance from the shaft 38 and terminate in a radial end portion designated by the numeral 52. A flexible membrane generally designated by the numeral 54 such as a piece of a flexible endless conveyor belt, is secured to all of the plate end portions 52 to provide a circumferential enclosure. Channel like strips 56 are positioned over the plate end portions 52 with the flexible membrane 54 therebetween to fixedly secure the flexible membrane 54 to the aforesaid plates. The flexible membrane 54 is so arranged on the plate end portions 52 that a catenary is formed between adjacent plates. The catenary forms longitudinal troughs or pockets 58 that receive the material 24 discharged from the endless conveyor belt 12. The channel members 56 serve to secure the flexible membrane 54 to the plate end portions 52 and maintain the desired catenary therebetween. The channel shaped strips 56 also serve as wear strips to minimize the wear of the portion of the flexible membrane that is in contact with the edges of the plate end portions 52.

The shaft 38 has a plate member 60 secured thereto with a plurality of tubular members 62 extending radially therefrom. A tubular member 62 is positioned between each pair of radially extending plates. A rod member 64 is slidably positioned in each of the tubular members 62 and has a weight 66 secured to the end portion thereof. The weight 66 is suitably secured or bonded to the flexible membrane 54 and is movable therewith, as will be later described.

There may be provided a backguard or plate 68 positioned beneath the head pulley 16 to deflect material that adheres to the endless conveyor belt 18 and does not follow the general trajectory indicated by the line 26. There is also provided a drive means for the drum feeder 36 that is connected preferably to the head pulley 16 and is schematically illustrated in FIGURE 1 by the dash-dot dash-dot (— . — .) line 70. Any suitable drive or connecting means such as a belt pulley arrangement or a series of meshing gears or a gear and shaft arrangement may be employed to drivingly connect the drum feeder 36 with the head pulley 16.

The transfer apparatus 10 illustrated in FIGURE 1 operates as follows. The drum feeder 36 is rotating in a clockwise direction as indicated by the arrow at a preselected speed in timed relation with the head pulley 16 which is also rotating in a clockwise direction. The particulate material 24 is discharged from the conveying reach 20 over the head pulley 16 and has the trajectory indicated by the line 26. The particulate material 24 strikes the flexible membrane 54 of the rotary feeder 36 and comes to rest in the upwardly facing pocket or recessed portion 58. The flexible membrane 54 absorbs the impact shock of the falling particulate material 24 and as the drum feeder 36 rotates in a clockwise direction the recessed pocket 58 containing the material rotates to discharge the material in the manner indicated in FIGURE 1 onto the conveying reach 32 of the endless conveyor 14 positioned below the drum feeder 36.

As the recessed pockets rotate downwardly the weights 66 bonded or secured to the underside of the flexible membrane 54 move radially outwardly relative to the shift 38 to reduce or flatten the catenary of the pocket 58 to assist in discharging the material from the flexible membrane 54 onto the conveyor belt 30. The shaft 64 secured to the weight 66 moves radially outwardly within the tubular member 62 as the recessed pocket 58 moves downwardly. As the drum feeder 36 continues to rotate the shifts 64 move radially inwardly within the tubular guide member 62 to again provide the desired through or catenary in the membrane 54. The flattening of the recessed portions or pockets 58 serves to effectively discharge wet sticky material therefrom onto the conveyor positioned therebelow. The rotary drum feeder 36 reduces the impact force of the particulate material 24 as it is discharged onto the endless conveyor belt 30.

For example, where the head pulley 16 has a diameter of about 36 inches and the endless conveyor belt 18 is traveling at a speed of 300 feet per minutes or 2.5 feet per second, material discharged from the head pulley 16, without the drum feeder 36 would strike the conveying reach 32 of endless belt 30 at a velocity of about 22.7 feet per second. With the drum feeder 36 positioned between the conveyors 12 and 14 the impact velocity of the particulate material 24 is reduced from about 22.7 feet per second to an impact velocity of about 10 feet per second. It should be understood by varying the position of the drum feeder 36 or positioning a plurality of drum feeders in overlying stepped relation with each other that the impact velocity of the particulate material may be further reduced and the distance between the respective conveyors can be further increased.

Figure 2:
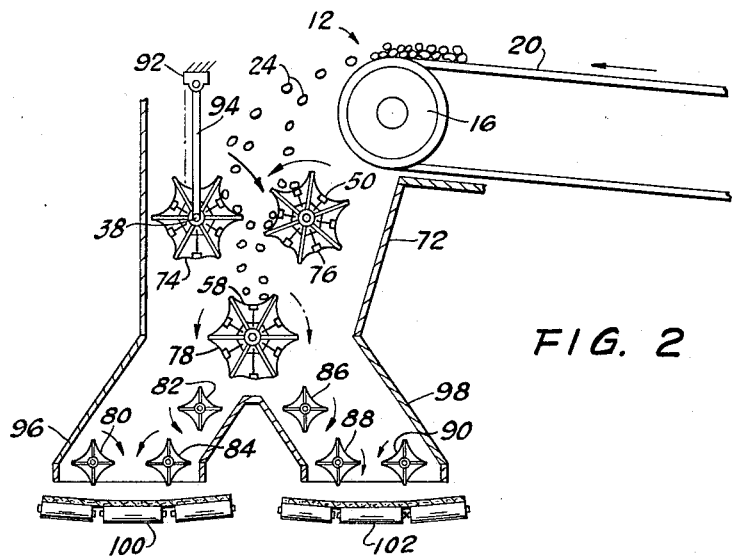
FIGURE 2 is a semidiagrammatic view in elevation of my improved transfer apparatus positioned in a bifurcated chute to transfer material from an elevated endless belt conveyor to a pair of other endless belt conveyors positioned therebelow.

In FIGURE 2 there is illustrated an arrangement of a plurality of rotary drum feeders positioned at a transfer station. Similar numerals will indicate similar parts in the embodiments illustrated in FIGURES 2–4. Within the enclosure 72 there are a plurality of rotary drum feeders designated by the numerals 74, 76, 78, 80, 82, 84, 86, 88 and 90. These rotary drum feeders are similar in construction to the rotary drum feeder 36 previously described in connection with the arrangement illustrated in FIGURE 1. Certain of the rotary drum feeders, as for example feeders 80, 82, 84, 86, 88, and 90, have four plates extending radially from the shafts instead of the six plates as previously described. The rotary drum feeders 74, 76, and 78, however, are of substantially the same construction as rotary drum feeder 36 and have six radially extending plates. A pair of rotary drum feeders 74–76 are positioned in substantially the same horizontal plane within the enclosure 72 and are spaced from each other. The feeder 74 may be a "floating" feeder and be supported from an overhead support means 92 by a pivoted support 94 secured to the axial shaft 38. The rotary drum feeder 76 is fixedly secured in the same manner as rotary drum feeder 36. Suitable drive means is provided to rotate the drum feeders 74 and 76 in the direction indicated by the arrows in FIGURE 2. Positioned below the pair of feeders 74 and 76 there is positioned feeder 78 which is rotatable in either direction as indicated by the arrows. The lower portion of the enclosure 72 is bifurcated and has outlet openings 96 and 98 that are arranged to distribute material onto a pair of conveyors 100 and 102. Positioned within the outlet 96 are rotary feeders 82 and 84 that are in overlying relation with each other and rotate in the direction indicated by the arrows. The rotary feeder 80 may be a floating feeder similar to feeder 74 and is arranged to rotate in a direction opposite to the feeders 82 and 84. Similarly, in outlet 98 the feeders 86 and 88 are positioned in overlying spaced relation to each other and rotate in the direction indicated by the arrows. Feeder 90 is positioned in substantially the same horizontal plane as feeder 88 and rotates in the direction indicated. The transfer apparatus illustrated in FIGURE 2 is arranged to receive particulate material from the conveying reach 20 of conveyor 12 and distribute the particulate material 24 onto the conveyors 100 and 102. Suitable drive means are provided to rotate all of the rotary drum feeders in the directions indicated. The material follows the trajectory indicated in FIGURE 2 and is received in the longitudinal pockets or troughs 58 of feeders 74 and 76. The direction of rotation of feeders 74 and 76 discharges the particulate material therefrom onto the feeder 78 positioned therebelow. The feeder 78 is controllable to rotate in either direction as indicated and is operable to distribute the material through outlet 96 or outlet 98, or both. The material is received in the longitudinal pockets or troughs 58 of feeder 78 and discharged therefrom onto the smaller feeders within the outlets 96 and 98. The particulate material is received on the smaller feeders and is discharged therefrom onto the receiving conveyors 100 or 102. With the arrangement illustrated in FIGURE 2 it is now possible to utilize a plurality of rotary drum feeders similar to feeder 36 and to distribute the particulate material onto a pair of endless belt conveyors. The rotary feeders serve to reduce the impact force of the material on the receiving conveyors as has been previously described and are capable of transferring particulate material having different physical properties.

Figure 3:
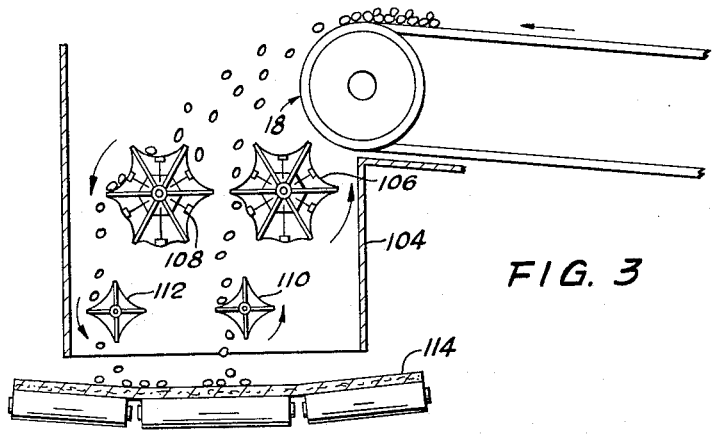
FIGURE 3 is another semidiagrammatic view in elevation of my transfer apparatus including a plurality of rotary drum feeders.

FIGURE 3 illustrates another arrangement of a plurality of rotary drum feeders in a transfer station and again similar numerals will designate similar parts. Within an enclosure 104 there are a pair of rotary feeders 106 and 108 that are positioned in substantially the same horizontal plane in spaced relation to each other. The rotary feeders are arranged to rotate in the same direction, as is indicated by the arrows, and to distribute the particulate material discharged from the conveyor belt 18 in two streams, as is indicated in FIGURE 3. Positioned below the feeders 106 and 108 are a pair of drum feeders 110 and 112 that have four radially extending plates instead of the six plates as illustrated in FIGURE 1. The material discharged from the rotary feeders 106 and 108 is received in the longitudinal pockets or troughs of the respective feeders 110 and 112 and discharged therefrom onto a conveyor belt 114 positioned therebelow. The rotary feeders 110 and 112 rotate in the same direction, as is indicated. The arrangement illustrated in FIGURE 3 may be used with a conveyor belt traveling at different velocities and conveying material thereon that is not discharged from the head pulley along substantially the same trajectory. The drum feeders 106 and 108 receive the particulate material discharged in diverse trajectories and feed the particulate material by means of the drum feeders 110 and 112 positioned therebelow onto the conveyor belt 114 and reduce the impact velocity of the material on the conveyor 114.

Figure 4:
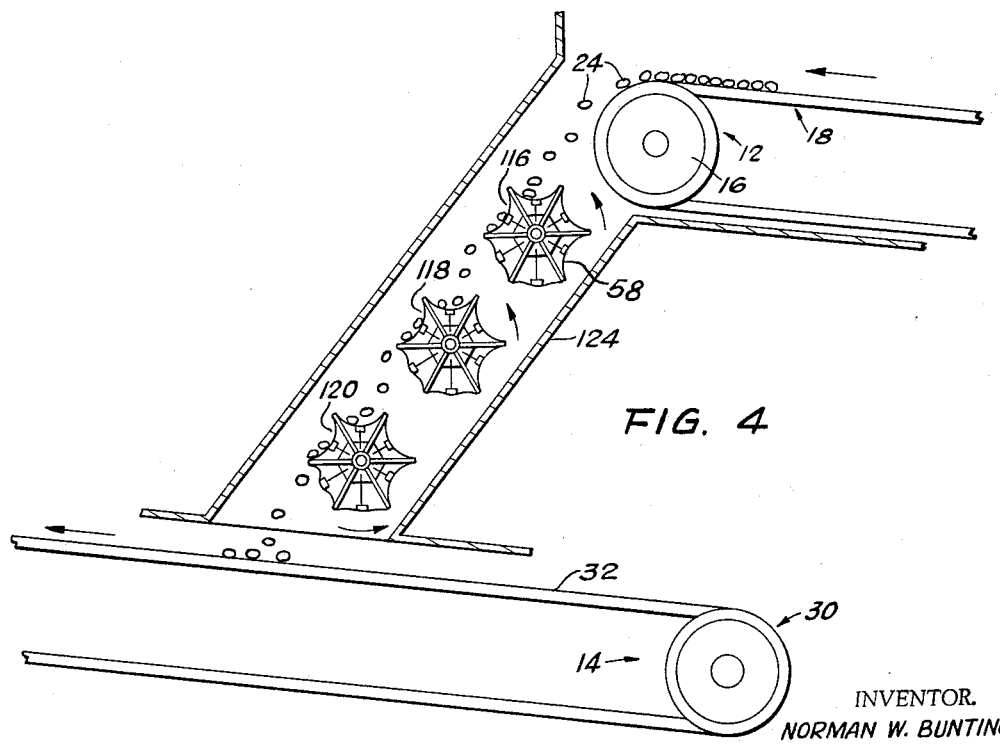
FIGURE 4 is a semidiagrammatic view in elevation of my improved transfer apparatus having a plurality of rotary drum feeders positioned in overlying relation.

In FIGURE 4 there is illustrated an arrangement where the one endless conveyor 12 is positioned at a substantial elevation from the receiving conveyor belt 14. To minimize the impact velocity on the conveying reach 32 of endless conveyor belt 30 a plurality of rotary drum feeders designated by the numerals 116, 118 and 120 are positioned in overlying stepped relation to each other within the chute or enclosure 124. The rotary drum feeders 116, 118 and 120 are arranged to be driven at a preselected speed in the direction indicated. The particulate material 24 discharged from the endless conveyor belt 18 over the head pulley 16 is received in the longitudinal pockets or troughs 58 of rotary drum feeder 116 so that the rotary drum feeder absorbs the impact velocity of the particulate material attained between the head pulley 16 and the rotary drum feeder 116. The particulate material 24 is discharged from the rotary drum feeder 116 into a longitudinal pocket or trough 58 of the rotary drum feeder 118 positioned therebelow. The rotary drum feeder 118 thus absorbs the impact velocity of the particulate material between the elevation of the rotary drum feeder 116 and the rotary drum feeder 118. Similarly, the rotary drum feeder 118 discharges the material onto rotary drum feeder 120 which, in turn, discharges the material onto the conveying reach 32 of the endless conveyor belt 14 positioned therebelow. The plurality of rotary drum feeders 116, 118 and 120 reduces substantially the impact velocity at which the particulate material 24 strikes the endless conveyor belt conveying reach 32.

According to the provisions of the patent statutes, the principle, preferred construction, and mode of operation of the invention have been explained and what is considered to represent its best embodiments has been illustrated. However, it should be understood that, within the scope of the appended claims, the invention may be practiced otherwise than as specifically illustrated and described.

I claim:
1. Apparatus for transferring particulate material from an elevated location to a receiver positioned therebelow comprising,
   a rotatable feeder positioned above said receiver in the path of the particulate material discharged from the elevated location,
   said feeder having an external surface with a plurality of recessed portions therein,
   at least one of said recessed portions being arranged in an upwardly facing position to receive therein the particulate material discharged from said elevated location and to discharge said particulate matter therefrom when said rotatable feeder rotates and the material receiving recessed portion assumes a downwardly facing position;

means to rotate said rotatable feeder; and means associated with each of the recessed portions of said external surface that decreases the depth of each said recessed portion as said rotatable feeder rotates, and each said recessed portion assumes a downwardly facing position, whereby the particulate material carried in each said recessed portion is effectively discharged from said downwardly facing recessed portions.

2. Apparatus for transferring particulate material from an elevated location to a receiver positioned therebelow comprising, a plurality of rotatable feeders positioned between said elevated location and said receiver, said feeders positioned in overlying spaced relation to each other, each of said rotatable feeders having an external surface of relatively flexible material forming a plurality of recessed portions therein, for receiving the particulate material discharged from above and holding said material as said feeder rotates, means to rotate said rotatable feeders and to reposition means associated with each of the recessed portions of said external surface that decreases the depth of each said recessed portion as said rotatable feeder rotates, and each said recessed portion assumes downwardly facing position whereby the particulate material carried in each said recessed portion is effectively discharged from said downwardly facing recessed portions, said rotatable feeders positioned in overlying relation with each other in a manner that said recessed portions of said rotatable feeder positioned thereabove upon rotation discharge said particulate material into recessed portions of a receiver positioned therebelow so that said rotatable feeders sequentially receive and discharge said particulate material as it is transferred from said elevated location to said receiver positioned therebelow.

3. Apparatus for transferring particulate material from an elevated location to a receiver positioned therebelow comprising, a plurality of rotatable feeders positioned between said elevated location and said receiver, said feeders positioned in spaced relation to each other in the path of the particulate material discharged from the elevated location, certain of said feeders positioned in the same first horizontal plane and other of said feeders positioned in a second horizontal plane between said first plane and said receiver, each of said rotatable feeders having an external surface of relatively flexible material forming a plurality of recessed portions therein, for receiving the particulate material discharged from above and holding said material as said feeder rotates, means to rotate said rotatable feeders, and means associated with each of the recessed portions of said external surface that decreases the depth of each of said recessed portions as said rotatable feeder rotates, and each said recessed portion assumes a downwardly facing position whereby the particulate material carried in each said recessed portion is effectively discharged from said downwardly facing recessed portions, said rotatable feeders being positioned in overlying spaced relation whereby the material discharged from a higher feeder falls into the material receiving recessed portions of a lower feeder from which such material is subsequently discharged as said feeders rotate and the material is transferred from said elevated location to the receiver therebelow.

4. Apparatus for transferring particulate material having different physical properties from an elevated endless conveyor belt to another endless conveyor belt positioned therebelow comprising:

a rotatable feeder positioned between said conveyor belts in a substantially horizontal plane and in the path of the particulate material discharged from the elevated endless conveyor belt, said rotatable feeder having a shaft rotatably supported between said elevated endless conveyor belt and said other conveyor belt positioned therebelow, a plurality of plates secured to said shaft and extending radially therefrom and terminating in radial end portions, a flexible membrane extending around said plate end portion and forming an external surface, said flexible membrane secured to said plate end portions in a manner that the portions of said flexible membrane between said plate end portions form, in an upwardly facing position, longitudinally recessed surfaces and in a downwardly facing position, relatively planar surfaces, said flexible membrane recessed portions between said plate end portions arranged to receive said particulate material discharged from said elevated endless conveyor belt and to absorb the impact force of the descending particulate material, said flexible membrane portions between said plate end portions arranged to flatten into relatively planar surfaces upon rotation to a downwardly facing position and discharge said particulate material onto the other endless conveyor belt positioned therebelow, and weight means secured to the underside of said flexible membrane between said plate end portions said weight means operable to urge said flexible membrane into a relatively planar surface in a downwardly facing position.

5. Apparatus for transferring particulate material having different physical properties from an elevated endless conveyor belt to another endless conveyor belt positioned therebelow comprising, a rotatable feeder positioned between said conveyor belts in a substantially horizontal plane and in the path of the particulate material discharged from the elevated endless conveyor belt, said rotatable feeder having a shaft rotatably supported between said elevated endless conveyor belt and said other conveyor belt positioned therebelow, a plurality of plates secured to said shaft and extending radially therefrom and terminating in radial end portions, a flexible membrane extending around said plate end portion and forming an external surface, said flexible membrane secured to said plate end portions in a manner that the portions of said flexible membrane between said plate end portions form, in an upwardly facing position, longitudinally recessed surfaces and in a downwardly facing position, relatively planar surfaces, said flexible membrane recessed portions between said plate end portions arranged to receive said particulate material discharged from said elevated endless conveyor belt and to absorb the impact force of the descending particulate material, said flexible membrane portions between said plate end portions arranged to flatten into relatively planar surfaces upon rotation to a downwardly facing position and discharge said particulate material onto the other endless conveyor belt positioned therebelow, weight means secured to the underside of said flexible membrane between said plate end portions, said weight means operable to urge said flexible membrane into a relatively planar surface in a downwardly facing position, and guide means secured to said shaft and arranged to guide said weight means linearly in a radial direction relative thereto.

References Cited by the Examiner

UNITED STATES PATENTS

| | | | |
|---|---|---|---|
| 1,025,914 | 5/1912 | Hicks | 198—25 X |
| 2,452,983 | 11/1948 | Birdseye | 198—84 X |
| 2,496,548 | 2/1950 | La Rosa et al. | 198—84 X |
| 2,824,675 | 2/1958 | Pepitone et al. | 198—153 X |
| 2,879,904 | 3/1959 | Walsh et al. | 198—62 X |
| 2,933,306 | 4/1960 | Davis et al. | 266—21 |
| 3,135,426 | 6/1964 | Muller et al. | 222—55 |

FOREIGN PATENTS

| | | |
|---|---|---|
| 1,181,966 | 11/1964 | Germany. |
| 337,438 | 5/1959 | Switzerland. |

EVON C. BLUNK, *Primary Examiner.*

M. L. AJEMAN, *Assistant Examiner.*